US008425709B2

(12) United States Patent
Muro

(10) Patent No.: US 8,425,709 B2
(45) Date of Patent: Apr. 23, 2013

(54) THERMAL TRANSFER SHEET AND IMAGE FORMATION METHOD

(75) Inventor: Naotsugu Muro, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 263 days.

(21) Appl. No.: 12/749,357

(22) Filed: Mar. 29, 2010

(65) Prior Publication Data

US 2010/0243142 A1 Sep. 30, 2010

(30) Foreign Application Priority Data

Mar. 30, 2009 (JP) ................................ 2009-083128

(51) Int. Cl.

| | |
|---|---|
| ***B32B 37/06*** | (2006.01) |
| ***B32B 37/14*** | (2006.01) |
| ***B32B 37/26*** | (2006.01) |
| ***B32B 38/10*** | (2006.01) |
| ***B32B 38/14*** | (2006.01) |
| ***B44C 1/24*** | (2006.01) |
| ***B44C 1/165*** | (2006.01) |
| ***B29C 65/02*** | (2006.01) |
| *B29C 65/48* | (2006.01) |
| *B32B 37/12* | (2006.01) |
| *B32B 37/16* | (2006.01) |

(52) U.S. Cl.

USPC ............ 156/240; 156/239; 156/247; 156/277

(58) Field of Classification Search .................. 156/239, 156/240, 247, 277

See application file for complete search history.

(56) References Cited

U.S. PATENT DOCUMENTS

| | | | | |
|---|---|---|---|---|
| 4,931,123 | A * | 6/1990 | Makishima | 156/234 |
| 5,250,133 | A * | 10/1993 | Kawamura et al. | 156/240 |
| 6,007,665 | A * | 12/1999 | Bourdelais et al. | 156/277 |
| 6,273,984 | B1 * | 8/2001 | Bourdelais et al. | 156/244.22 |
| 6,942,950 | B2 * | 9/2005 | Lobo et al. | 430/14 |
| 7,022,385 | B1 * | 4/2006 | Nasser | 428/32.17 |
| 7,473,450 | B2 * | 1/2009 | Hirota | 428/32.77 |
| 7,485,402 | B2 * | 2/2009 | Arai et al. | 430/201 |
| 2004/0261936 | A1 * | 12/2004 | Laney et al. | 156/229 |

FOREIGN PATENT DOCUMENTS

| | | | | |
|---|---|---|---|---|
| EP | 1813434 | A1 | * | 8/2007 |
| JP | 2003-205686 | A | | 7/2003 |
| JP | 2003205686 | A | * | 7/2003 |
| JP | 2006-116892 | A | | 5/2006 |
| JP | 2006116892 | A | * | 5/2006 |

OTHER PUBLICATIONS

English translation of JP 2003-205686, Murata et al. Jul. 22, 2003.*
English translation of JP 2006-116892, Fukui et al. May 11, 2006.*

* cited by examiner

*Primary Examiner* — Sonya Mazumdar
(74) *Attorney, Agent, or Firm* — Sughrue Mion, PLLC

(57) ABSTRACT

A thermal transfer sheet having a subbing layer and a dye layer in this order on a substrate film, wherein the subbing layer contains colloidal silica or colloidal alumina, and the dye layer contains a polyvinyl acetal resin having an acetacetal group in an amount of from 3.0 to 30.0 molar times the butyral group therein, and a dye of the following formula (1):

(1)

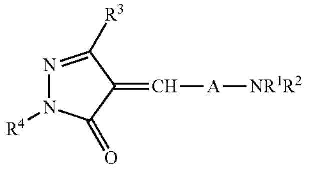

wherein A represents a phenylene group; $R^1$ and $R^2$ represent a hydrogen atom, an alkyl group, or an aryl group; $R^3$ represents an amino group, an alkoxy group, or an aryloxy group; and $R^4$ represents an alkyl group, or an aryl group.

3 Claims, No Drawings

THERMAL TRANSFER SHEET AND IMAGE FORMATION METHOD

CROSS-REFERENCE TO RELATED APPLICATIONS

The present application claims the benefit of priority from Japanese Patent Application No. 2009-083128, filed on Mar. 30, 2009, the contents of which are herein incorporated by reference in their entirety.

BACKGROUND OF THE INVENTION

1. Field of the Invention

The present invention relates to a thermal transfer sheet and an image formation method using it.

2. Description of the Related Art

Recently, a dye diffusion transfer recording system has become specifically noted as a process capable of producing color hard copies of which the image quality is the nearest to that of silver salt photographs. Moreover, as compared with silver salt photographs, the system has other various advantages in that it is a dry system, it can produce visible images directly from digital data, it is simple in image duplication, and the system for image formation can be constructed relatively inexpensively.

In the dye diffusion transfer recording system, a dye (or colorant)-containing thermal transfer sheet and a thermal transfer image-receiving sheet (hereinafter this may be simply referred to as "image-receiving sheet") are put one upon another, and the thermal transfer sheet is heated with a heating element such as thermal head from which the heat generation is controlled by electric signals given thereto, whereby the dye in the thermal transfer sheet is transferred onto the image-receiving sheet for image information recording thereon. In this, three colors of cyan, magenta and yellow, or four colors of these and black are recorded as superimposed, thereby giving a color image having a continuously changing color density in a mode of transfer recording.

JP-A 2003-205686 discloses a thermal transfer sheet containing a pyrazolonemethine-type yellow dye having a specific structure.

JP-A 2006-116892 discloses a thermal transfer sheet containing, in the subbing layer thereof, inorganic fine particles of colloidal silica or colloidal alumina.

On the other hand, recently, dye diffusion transfer recording systems have become much popularized and have become driven at a higher speed, and they have become installed in amusement parks, sightseeing spots and the like for application to real-time printing.

However, in outputting prints from conventional dye diffusion transfer recording systems installed in amusement parks or sightseeing spots, there often occur some troubles of panel failure and at worst system down.

The present inventors investigated the troubles with conventional dye diffusion transfer recording systems, and have known that, inside the troubled printers, a severe environmental cycle of high-temperature and low-humidity in daytime and low-temperature and high-humidity in nighttime is repeated, and with the lapse of time, the environmental change cycles after all have some negative influences on the runnability of the thermal transfer sheet charged inside the printer in the form of a roll, during image formation thereon.

SUMMARY OF THE INVENTION

An object of the invention is to provide a thermal transfer sheet that enables stable printing thereon even in an installation environment where an environmental change of high-temperature and low-humidity in daytime and low-temperature and high-humidity in nighttime is repeated, and to provide an image formation method of using it.

The present inventors have assiduously studied and, as a result, have found that the above-mentioned objects can be attained by the following means.

[1] A thermal transfer sheet having a subbing layer and a dye layer in this order on a substrate film, wherein:

the subbing layer contains at least one of colloidal silica and colloidal alumina, and the dye layer contains a polyvinyl acetal resin having an acetacetal group in an amount of from 3.0 to 30.0 molar times the butyral group therein, and a dye of the following formula (1):

(1)

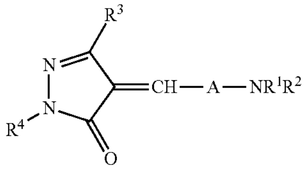

wherein A represents a substituted or unsubstituted phenylene group; $R^1$ and $R^2$ each independently represent a hydrogen atom, a substituted or unsubstituted alkyl group, or a substituted or unsubstituted aryl group; $R^3$ represents a substituted or unsubstituted amino group, a substituted or unsubstituted alkoxy group, or a substituted or unsubstituted aryloxy group; and $R^4$ represents a substituted or unsubstituted alkyl group, or a substituted or unsubstituted aryl group.

[2] The thermal transfer sheet of [1], wherein the polyvinyl acetal resin has an acetacetal group in an amount of from 3.0 to 12.0 molar times the butyral group therein.

[3] The thermal transfer sheet of [1] of [2], wherein the polyvinyl acetal resin has an acetacetal group in an amount of from 3.0 to 6.0 molar times the butyral group therein.

[4] The thermal transfer sheet of any one of [1] to [3], wherein the mass-average molecular weight of the polyvinyl acetal resin is from 90,000 to 400,000.

[5] The thermal transfer sheet of any one of [1] to [4], wherein the dye layer contains an acrylic polyol resin or a methacrylic polyol resin in an amount of from 0.1 to 20% by mass relative to the entire binder in the dye layer.

[6] The thermal transfer sheet of any one of [1] to [5], wherein the subbing layer contains colloidal silica.

[7] A method for image formation comprising:

putting a thermal transfer sheet and a thermal transfer image-receiving sheet one upon another in such a manner that a dye layer of the thermal transfer sheet is kept in contact with a receiving layer of the thermal transfer image-receiving sheet, wherein the thermal transfer sheet has a subbing layer and a dye layer in this order on a substrate film, in which the subbing layer contains at least one of colloidal silica and colloidal alumina, and the dye layer contains a polyvinyl acetal resin having an acetacetal group in an amount of from 3.0 to 30.0 molar times the butyral group therein, and a dye of the following formula (1):

(1)

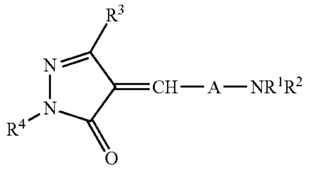

wherein A represents a substituted or unsubstituted phenylene group, $R^1$ and $R^2$ each independently represent a hydrogen atom, a substituted or unsubstituted alkyl group, or a substituted or unsubstituted aryl group, $R^3$ represents a substituted or unsubstituted amino group, a substituted or unsubstituted alkoxy group, or a substituted or unsubstituted aryloxy group, and $R^4$ represents a substituted or unsubstituted alkyl group, or a substituted or unsubstituted aryl group, wherein the thermal transfer image-receiving sheet has, on a support, at least one heat-insulating layer and at least one receiving layer; and applying heat energy in accordance with an image signal by a heating element from the side of the thermal transfer sheet opposite to the side coated with the dye layer, thereby recording an image on the image-receiving sheet.

[8] The image formation method of [7], wherein the heat-insulating layer contains hollow polymer particles, and the receiving layer contains a polymer latex or a water-soluble polymer.

[9] The image formation method of [7] or [8], wherein, when a laminate piece having a 5 cm length of the two sheets overlaid in such a manner that the dye layer of the thermal transfer sheet is kept in contact with the receiving layer of the thermal transfer image-receiving sheet is peeled in such a manner that any one sheet of the thermal transfer sheet and the thermal transfer image-receiving sheet is fixed and the other sheet is peeled at 180 degrees in the lengthwise direction, the peeling force is at most 0.30 N.

According to the invention, there are provided a thermal transfer sheet that enables stable printing thereon even in an installation environment where an environmental change of high-temperature and low-humidity in daytime and low-temperature and high-humidity in nighttime is repeated, and an image formation method of using it.

BEST MODE FOR CARRYING OUT THE INVENTION

The invention is described in detail hereinunder. In this description, the numerical range expressed by the wording "a number to another number" means the range that falls between the former number indicating the lowermost limit of the range and the latter number indicating the uppermost limit thereof.

[Thermal Transfer Sheet]

First described is the thermal transfer sheet of the invention. The thermal transfer sheet of the invention has, sequentially in that order on a substrate film, a subbing layer containing at least one of colloidal silica and colloidal alumina, and a dye layer containing a polyvinyl acetal resin having an acetacetal group in an amount of from 3.0 to 30.0 molar times the butyral group therein, and a dye of the following formula (1). The thermal transfer sheet is put on a thermal transfer image-receiving sheet for thermal transfer image formation thereon, and heated with a thermal printer head or the like from the side of the thermal transfer sheet to thereby transfer the dye from the thermal transfer sheet onto the thermal transfer image-receiving sheet.

(1)

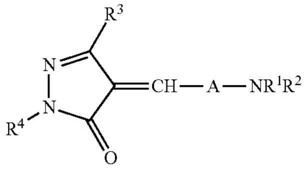

wherein A represents a substituted or unsubstituted phenylene group; $R^1$ and $R^2$ each independently represent a hydrogen atom, a substituted or unsubstituted alkyl group, or a substituted or unsubstituted aryl group; $R^3$ represents a substituted or unsubstituted amino group, a substituted or unsubstituted alkoxy group, or a substituted or unsubstituted aryloxy group; $R^4$ represents a substituted or unsubstituted alkyl group, or a substituted or unsubstituted aryl group.

<Substrate Film>

Not specifically defined in the invention, the substrate film in the thermal transfer sheet may be any conventional known one satisfying the desired heat resistance and strength. For the substrate film, for example, preferred are thin paper such as glassine paper, condenser paper, puffin paper, etc.; heat-resistant polyesters such as polyethylene terephthalate, polyethylene naphthalate, polybutylene terephthalate, etc.; stretched or unstretched films of plastics such as polyphenylene sulfide, polyether ketone, polyether sulfone, polypropylene, polycarbonate, cellulose acetate, polyethylene derivative, polyvinyl chloride, polyvinylidene chloride, polystyrene, polyamide, polyimide, polymethylpentene, ionomer, etc.; laminates of those materials, etc. Of those, more preferred are polyester films, and even more preferred are stretched polyester films. Especially preferably, an easy-adhesion layer is formed on at least one surface of the substrate film, and the film is then stretched.

The thickness of the substrate film may be suitably defined in accordance with the material of the film so that the film could have intended strength and heat resistance. Preferably, the thickness is from 1 to 30 μm or so, more preferably from 1 to 20 μm or so, even more preferably from 3 to 10 μm or so.

The substrate film of the thermal transfer sheet may be processed for easy adhesion treatment for the purpose of enhancing the wettability and the adhesiveness of the coating liquid to be applied thereto. For the easy adhesion treatment, employable are known resin surface modification techniques of, for example, corona discharge treatment, flame treatment, ozone treatment, UV treatment, radiation treatment, surface-roughening treatment, chemical treatment, vacuum plasma treatment, atmospheric plasma treatment, primer treatment, graftation treatment, etc.

<Subbing Layer>

The thermal transfer sheet of the invention has a subbing layer between the dye layer and the substrate film, and the subbing layer contains at least one of colloidal silica and colloidal alumina. Given to the sheet, the subbing layer of the type has the function of reinforcing the adhesiveness between the dye layer and the substrate film in the thermal transfer sheet of the invention. Another function of the subbing layer is, in thermal transfer with the sheet as combined with a thermal transfer image-receiving sheet, preventing any abnormal transfer of the dye layer to the image-receiving sheet. Further, the dye in the dye layer hardly moves to and fixes in the subbing layer, and therefore the subbing layer acts to prevent the dye from being transferred from the dye layer to the subbing layer during printing, thereby effectively augmenting the dye diffusion into the receiving layer of the image-receiving sheet, and as a result, the transfer density in printing may be increased and the print density is thereby increased. The subbing layer as referred to herein has still another function of securing the adhesion between the substrate film and the dye layer.

Colloidal silica means ultrafine particles of silicic anhydride, and colloidal alumina means ultrafine particles of aluminium oxide.

Their shape is not specifically defined, and the particles may be any of spherical, acicular or tabular ones. The mean particle size is preferably from 10 nm to 50 nm, more preferably from 10 to 30 nm.

As colloidal silica and colloidal alumina, commercial products are available and usable herein. Commercial products of colloidal silica include Nissan Chemical Industry's colloidal silica, trade names of Snowtex OSX, Snowtex XS, Snowtex S, Snowtex OS. Commercial products of colloidal alumina include Nissan Chemical Industry's colloidal alumina, trade names Alumina Sol 100, Alumina Sol 200, Alumina Sol 520.

Preferably, the subbing layer in the thermal transfer sheet of the invention contains colloidal silica from the viewpoint of controlling the peeling force and enhancing the print runnability, especially from the viewpoint of controlling the peeling force and enhancing the print runnability in aging through thermal cycles.

In the thermal transfer sheet of the invention, the combination of the subbing layer containing at least one of colloidal silica and colloidal alumina, and the polyvinyl acetal resin, in which the ratio of the acetacetal group to the butyral group is defined to fall within a specific range, in the dye layer to be mentioned below brings about the effect of increasing the transfer density of the thermal transfer sheet.

In the image formation method of the invention to be mentioned below, when the thermal transfer sheet of the invention that has a subbing layer containing at least one of colloidal silica and colloidal alumina is combined with a thermal transfer image-receiving sheet that has a heat-insulating layer containing hollow polymer particles, or with a thermal transfer image-receiving sheet that has a receiving layer containing a polymer latex or a water-soluble polymer, or with a thermal transfer image-receiving sheet that has both such a heat-insulating layer and such a receiving layer, in image formation on the receiving layer, then this is further effective for bettering the runnability of the combined sheets to which the invention is directed.

(Method for Formation of Subbing Layer)

A subbing layer coating liquid may be used in forming the subbing layer. The subbing layer contains at least one of colloidal silica and colloidal alumina, and may optionally contain, if desired, a water-soluble resin such as polyvinyl alcohol, polyvinyl pyrrolidone or the like. Preferably, the layer contains polyvinyl alcohol from the viewpoint of enhancing the adhesiveness between the substrate and the dye layer.

The coating liquid that comprises, as the main ingredient thereof, a dispersion of colloidal fine particles is applied to the substrate to form thereon the intended subbing layer according to a known coating method of gravure printing, screen printing or the like. The solid content of the coating layer after dried (in terms of solid content thereof—unless otherwise specifically indicated, the coating layer in the invention is in terms of the solid content thereof) is preferably from 0.03 to 0.3 $g/m^2$, more preferably from 0.03 to 0.1 $g/m^2$.

When the solid content of the subbing layer after dried is at most 0.3 $g/m^2$, then the dye transferability onto the thermal transfer image-receiving sheet during image formation may be good; and when at least 0.03 $g/m^2$, then the layer may be free from a trouble of coating unevenness and the adhesiveness of the sheet to the image-receiving sheet in image formation may be good.

<Dye Layer>

The dye layer in the thermal transfer sheet of the invention contains a polyvinyl acetal resin having an acetacetal resin in an amount of from 3.0 to 30.0 molar times the butyral group therein, and a dye of the following formula (1). The thermal transfer sheet of the invention has the substrate film, the subbing layer and the dye layer in that order.

(Dye)

The thermotransferable dye of formula (1) for use in the invention is described hereinunder in more detail.

(1)

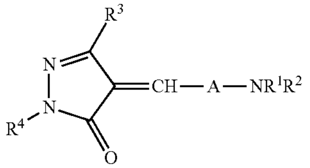

In formula (1), A represents a substituted or unsubstituted phenylene group; $R^1$ and $R^2$ each independently represent a hydrogen atom, a substituted or unsubstituted alkyl group, or a substituted or unsubstituted aryl group; $R^3$ represents a substituted or unsubstituted amino group, a substituted or unsubstituted alkoxy group, or a substituted or unsubstituted aryloxy group; $R^4$ represents a substituted or unsubstituted alkyl group, or a substituted or unsubstituted aryl group.

A is a substituted or unsubstituted phenylene group, preferably an unsubstituted phenylene group.

$R^1$ and $R^2$ each are independently a hydrogen atom, a substituted or unsubstituted alkyl group, or a substituted or unsubstituted aryl group, more preferably a substituted or unsubstituted alkyl group (preferably having from 1 to 6 carbon atoms), most preferably an ethyl group.

$R^3$ is a substituted or unsubstituted amino group, a substituted or unsubstituted alkoxy group, or a substituted or unsubstituted aryloxy group, preferably a dialkylamino group (preferably having from 2 to 8 carbon atoms), an unsubstituted amino group, or an unsubstituted alkoxy group (preferably having from 1 to 6 carbon atoms), more preferably a dialkylamino group (preferably having from 2 to 4 carbon atoms), or an unsubstituted alkoxy group (preferably having from 1 to 4 carbon atoms), even more preferably an unsubstituted alkoxy group (preferably having from 1 to 4 carbon atoms), still more preferably an ethoxy group.

$R^4$ is a substituted or unsubstituted alkyl group, or a substituted or unsubstituted aryl group, preferably a substituted or unsubstituted alkyl group having from 1 to 8 carbon atoms, or a substituted or unsubstituted aryl group having from 6 to 10 carbon atoms, more preferably a substituted or unsubstituted aryl group having from 6 to 10 carbon atoms, even more preferably a substituted or unsubstituted phenyl group, most preferably an unsubstituted phenyl group.

Specific compound examples of the dye of formula (1) are shown below, by which, however, the invention should not be limitatively interpreted.

TABLE 1

| Dye of Formula (1) | | | | | |
|---|---|---|---|---|---|
| Compound Example | A | $R^1$ | $R^2$ | $R^3$ | $R^4$ |
| 1-1 | Ph | ethyl | ethyl | ethoxy | phenyl |
| 1-2 | Ph | ethyl | ethyl | dimethylamino | phenyl |
| 1-3 | Ph | n-propyl | n-propyl | ethoxy | phenyl |
| 1-4 | Ph | n-butyl | n-butyl | ethoxy | phenyl |

(Ph: 1,4-phenylene)

Of the dyes of formula (1), those unavailable as commercial products can be produced through ordinary dehydrating condensation of a pyrazolone derivative and an aminobenzaldehyde derivative.

In the invention, the dye layer may contain any other dye than the dye of formula (1), as combined. Not specifically defined, the additional dye may be anyone capable of diffusing under heat, capable of being incorporated into the thermal transfer sheet and capable of being transferred under heat from the thermal transfer sheet onto an image-receiving sheet; and the additional dye may be any ordinary dye heretofore generally used in thermal transfer sheets, or any known dye.

The additional dye preferred for combination use with the dye of formula (1) includes, for example, methine dyes such as diarylmethane dyes, triarylmethane dyes, thiazole dyes, merocyanine dyes, etc.; azomethine dyes such as typically indaniline, acetophenonazomethine, pyrazoloazomethine, imidazolazomethine, imidazoazomethine, pyridonazomethine; xanthene dyes; oxazine dyes; cyanomethylene dyes such as typically dicyanostyrene, tricyanostyrene; thiazine dyes; azine dyes; acridine dyes; benzenazo dyes; azo dyes such as pyridonazo dyes, thiophenazo dyes, isothiazolazo dyes, pyrrolazo dyes, pyralazo dyes, imidazolazo dyes, thiadiazolazo dyes, triazolazo dyes, disazo dyes; spiropyrane dyes; indolinospiropyrane dyes; fluoran dyes; rhodamine lactam dyes; naphthoquinone dyes; anthraquinone dyes; quinophthalone dyes; etc.

As specific examples of the additional dye to be combined with the dye of formula (1), yellow dyes include Disperse Yellow 231, Disperse Yellow 201, Solvent Yellow 93, etc., and of those, preferred is Solvent Yellow 93; magenta dyes include Disperse Violet 26, Disperse Red 60, Solvent red 19, etc., and of those, preferred are Disperse Violet 26 and Disperse Red 60; and cyan dyes include Solvent Blue 63, Solvent Blue 36, Disperse Blue 354, Disperse Blue 35, etc., and of those, preferred is Solvent Blue 63. Needless-to-say, any other suitable dyes than these dyes exemplified herein are also usable in the invention.

Dyes of different colors as above may be combined in any desired manner for use herein. For example, a black dye may be formed by combination of different dyes.

In case where the dye of formula (1) is in the yellow dye layer to be mentioned below, its content is preferably from 10 to 90% by mass of all the dyes in the yellow dye layer, more preferably from 20 to 80% by mass.

In case where the dye of formula (1) is in the magenta or cyan dye layer, its content is preferably from 0.1 to 5% by mass of all the dyes in the dye layer, more preferably from 0.5 to 2% by mass. In case where the content of the dye, of formula (1) in the magenta or cyan dye layer is at most 5% by mass, then the color reproducibility hardly lowers.

(Binder in Dye Layer)

In the thermal transfer sheet of the invention, the dye of formula (1) must be in the dye layer formed on a substrate film, in which the dye is dispersed in a binder (resin binder). The polyvinyl acetal resin to be used as the binder in the dye layer in the invention is described in detail hereinunder.

Polyvinyl Acetal Resin:

The thermal transfer sheet of the invention contains, in the dye layer therein, a polyvinyl acetal resin (modified Poval) having an acetacetal group in an amount of from 3.0 to 30.0 molar times the butyral group therein.

The polyvinyl acetal resin may be represented by the following formula (2):

(2)

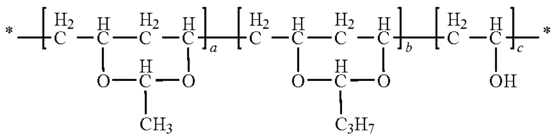

wherein a indicates the molar ratio of the acetal structure containing an acetacetalized OH group; b indicates the molar ratio of the acetal structure containing a butyralized OH group; c indicates the molar ratio of the vinyl alcohol structure; a, b and c each are more than 0% and less than 100%; and a+b+c=100%.

The polyvinyl acetal resin contains an acetacetal group in an amount of from 3.0 to 30 molar times the butyral group therein, or that is, in the resin, the ratio of the acetacetal group to the butyral group (a/b in formula (2), in this description, this may be referred to as Ac/Bt) is from 3.0 to 30.0. Preferably, the polyvinyl acetal resin contains an acetacetal group in an amount of from 3.0 to 12.0 molar times the butyral group from the viewpoint of further increasing the transfer density, even more preferably in an amount of from 3.0 to 6.0 molar times from the viewpoint of increasing the solubility in solvent of the polyvinyl acetal resin and of enhancing the producibility. When the amount of the acetacetal group is at least 3.0 molar times the butyral group, then not only the effect of the invention can be sufficiently exhibited but also the storability of the thermal transfer sheet is bettered; and when the ratio is at most 30.0, then the transfer density is favorably increased.

The relative molar ratio between the acetacetal group and the butyral group in the polyvinyl acetal resin can be determined through $^1$H-NMR.

Specifically, a sample of the polyvinyl acetal resin to be analyzed is dissolved in a heavy DMSO solution, and analyzed fro $^1$H-NMR spectrometry according to a known method. Of the spectrum, the chemical shift (tetramethylsilane is used as the internal standard substance) falling from 0.6 ppm to 0.9 ppm is assigned to the proton (3H) of the methyl group at the terminal of the butyral group, and the chemical shift falling from 0.9 ppm to 1.2 ppm is assigned to the proton (3H) of the methyl group at the terminal of the acetacetal group; and their ranges are integrated to give the relative molar numbers a and b of the acetacetal group and the butyral group, respectively, from which the ratio a/b is computed.

The constitution of the recurring units of the polyvinyl acetal resin is not specifically defined. The resin may be a random copolymer or a block copolymer.

The polyvinyl acetal resin may be a copolymer containing any other recurring unit than those in formula (2), but preferably contains only the recurring units in formula (2).

The polyvinyl alcohol resin is preferably 1) a modified Poval resin obtained through condensation of the —OH group in Poval (polyvinyl alcohol) with an aldehyde compound and having at least an acetacetal group and a butyral group, or 2) a mixture of a polyvinyl acetacetal resin and a polyvinyl butyral resin.

The polyvinyl acetal resin may be any of the above 1) or 2), or may be a mixture of 1) and 2), but is preferably the above 1) from the viewpoint of the effect of the invention.

Preferably, the mass-average molecular weight of polyvinyl acetal in the invention is from 90,000 to 400,000, more preferably from 90,000 to 370,000, even more preferably from 90,000 to 340,000. When the molecular weight is at most 400,000, then the viscosity of the coating liquid may not be too high and the coatability may be good; but when less than 90,000, the effect of the invention could not be well exhibited.

The mass-average molecular weight is defined as the polystyrene-equivalent molecular weight detected with a differential refractiometer in a solvent of THF, using a GPC analyzer with a column of TSKgel GMH×L, TSKgel G4000H×L or TSKgel G2000H×L (all trade names by Tosoh).

In the invention, commercial products of polyvinyl acetal may be used. Typical examples of commercial products of polyvinyl acetal include Denkabutyral 3000-1, 5000-A, 6000-C, 6000-CS (all trade names by Denki Kagaku) and Eslec BX-1, BX-5, KS-5 (all trade names by Sekisui Chemical), etc.

These polyvinyl acetals may be produced according to a known method. Concretely, polyvinyl alcohol is reacted with acetaldehyde or butylaldehyde in the presence of an acid catalyst in water or in an organic solvent. The acid catalyst for acetalization includes inorganic acids such as hydrochloric acid, sulfuric acid, phosphoric acid, etc., acetic acid, p-toluenesulfonic acid, etc. The amount of the catalyst to be used is preferably from 0.005 to 0.2 mols relative to 1 mol of the aldehyde to be used for the reaction. The acetalization temperature may be from 20° C. to 100° C. or so, preferably from 40° C. to 90° C. Depending on the degree of polymerization of the commercial products of polyvinyl alcohol to be used, the molecular weight of the final products, polyvinyl acetal can be controlled. Polyvinyl alcohols having a different degree of polymerization are, for example, Poval (trade name by Kuraray) PVA110, PVA117, PVA120, PVA124, etc.

Preferably, the polyvinyl acetal resin accounts for at least 50% by mass of the entire binder in the dye layer, more preferably at least 80% by mass, most preferably at least 90% by mass.

(Meth)acrylic Polyol Resin:

Preferably, the thermal transfer sheet of the invention contains, in the dye layer therein, a (meth)acrylic polyol resin, or that is, an acrylic polyol resin or a methacrylic polyol resin in an amount of from 0.1 to 20% by mass of the entire binder in the dye layer, from the viewpoint of enhancing the print runnability and enhancing the storability of the thermal transfer sheet, more preferably in an amount of from 1.0 to 10% by mass.

The (meth)acrylic polyol resin is a (co)polymer of a (meth) acrylic acid monomer and has a hydroxyl group in the side chain thereof. Preferably, the (meth)acrylic polyol resin is a (co)polymer of a (meth)acrylic acid derivative having a hydroxyl group in the terminal of the ester moiety.

Examples of the acrylic acid derivative having a hydroxyl group in the terminal of the ester moiety include hydroxyalkyl (meth)acrylates such as 2-hydroxyethyl (meth)acrylate, 2-hydroxypropyl (meth)acrylate, 4-hydroxybutyl (meth) acrylate, etc.

The (meth)acrylic polyol resin may be copolymerized with any other vinylic monomer or an alkyl (meth)acrylate monomer, such as styrene, methyl (meth)acrylate, etc. Of those, a styrene monomer is especially preferred.

The (meth)acrylic polyol resin for use herein may be commercial products, such as Coatax LH-635, LH-615, LH-633 (trade names by Toray Fine Chemical), Acrit 6AN-400, 6AZ-215, 6AN-493 (trade names by Taisei Kako), etc.

Other Binder for Dye Layer:

In the thermal transfer sheet of the invention, the dye layer may contain any other known binder resin than the above-mentioned polyvinyl acetal resin and (meth)acrylic polyol resin. Examples of the additional binder resin include acrylic resins such as polyacrylonitrile, polyacrylate, polyacrylamide, etc.; polyvinyl acetal resins such as polyvinyl acetacetal, polyvinyl butyral, etc.; modified cellulose resins such as ethyl cellulose, hydroxyethyl cellulose, ethyl hydroxycellulose, hydroxypropyl cellulose, ethylhydroxyethyl cellulose, methyl cellulose, cellulose acetate, cellulose acetate butyrate, cellulose acetate propionate, cellulose nitrate, etc.; cellulose resins such as nitrocellulose, ethylhydroxyethylcellulose, ethyl cellulose, etc.; polyurethane resins, polyamide resins, polyester resins, polycarbonate resins, phenoxy resins, phenolic resins, epoxy resins, various elastomers.

(Constitution of Dye Layer)

In the dye layer, the ratio by mass of the dye of formula (1) to the binder, or that is, the ratio of dye/binder is preferably from 0.3 to 2.0, more preferably from 0.5 to 1.5, most preferably from 0.7 to 1.3.

In the dye layer in the thermal transfer sheet of the invention, the solid content of the dye to the total solid content in the dye layer is preferably from 20 to 70% by mass, more preferably from 35 to 60% by mass.

The dye layer may be a single layer or may have a multilayer structure. The compositions of the constitutive layers of the multilayer structure having dye layer may be the same or different.

Regarding the dye layer constitution in the thermal transfer sheet of the invention, yellow, magenta and cyan dye layers and optionally a black dye layer are separately and repeatedly formed by coating on one and the same substrate according to a frame sequential method.

In one example, yellow, magenta and cyan dye layers are separately and repeatedly formed by coating on one substrate film in the long axis direction in accordance with the area of the recording surface of the thermal transfer image-receiving sheet to be combined with the thermal transfer sheet, according to a frame sequential method. Applied to at least one layer of these three layers, preferably, a transferable protective layer (this may be a transferable protective layer laminate to be mentioned below) is provided.

In this embodiment, preferably, a mark may be put to the thermal transfer sheet for the purpose of transmitting the starting point of each color layer to printer. In the embodiment of producing a thermal transfer sheet by separately and repeatedly forming the individual layers by coating on a substrate according to a frame sequential method, the thermal transfer sheet produced enables image formation by dye transfer and protective layer lamination on the formed image all at once.

However, the invention is not limited to the mode of formation of dye layers in the manner as above. A sublimable thermal transfer dye layer and a thermofusible transfer dye layer may be provided on one substrate, or any other dye layers than yellow, magenta, cyan and black layers may be provided; and any such modification is applicable to the invention. Regarding the form thereof, the thermal transfer sheet may be a long strip-like one, or may be in the form of sheets. The invention is especially favorable to the embodiment where the thermal transfer sheets before use are stored as overlaid one upon another.

(Coating Method for Dye Layer)

The dye layer coating liquid for use in forming the dye layer by coating contains a thermal transfer dye and a binder resin, and if desired, it may further contain an organic fine powder or an inorganic fine powder, a wax, a silicone resin, a fluorine-containing organic compound, etc.

The dye layer may be formed according to an ordinary coating method of roll coating, bar coating, gravure coating, gravure reverse coating or the like. The coating amount of the dye layer is preferably from 0.1 to 2.0 g/m$^2$, more preferably from 0.2 to 1.2 g/m$^2$.

Preferably, the thickness of the dye layer is from 0.1 to 2.0 more preferably from 0.2 to 1.2 μm.

<Dye Barrier Layer>

The thermal transfer sheet of the invention may have a dye barrier layer provided between the dye layer and the substrate film.

<Easy-Adhesion Layer>

In the thermal transfer sheet of the invention, an easy-adhesion layer may be formed on the substrate film by coating. The resin for use in the easy-adhesion layer includes polyester resins, polyacrylate resins, polyvinyl acetate resins, polyvinyl chloride resins, vinyl resins such as polyvinyl alcohol resins, polyvinylacetal resins such as polyvinyl acetacetal and polyvinyl butyral, polyether resins, polyurethane resins, styrene acrylate resins, polyacrylamide resins, polyamide resins, polystyrene resins, polyethylene resins, polypropylene resins, etc.

In case where an easy-adhesion layer is not provided, the surface of the substrate film may be processed for easy adhesion treatment for the purpose of enhancing the wettability and the adhesiveness of the coating liquid. For the easy adhesion treatment, employable are known resin surface modification techniques of, for example, corona discharge treatment, flame treatment, ozone treatment, UV treatment, radiation treatment, surface-roughening treatment, chemical treatment, vacuum plasma treatment, atmospheric plasma treatment, primer treatment, graftation treatment, etc.

A film for the substrate film may be formed by melt extrusion, and the unstretched film may be coated with coating layers and then stretched.

Two or more different types of the above treatments may be combined.

<Transferable Protective Layer Laminate>

Preferably, the thermal transfer sheet has a transferable protective layer laminate.

The transferable protective layer laminate forms a protective layer of a transparent resin through thermal transfer onto the image formed on the thermal transfer image-receiving sheet, thereby covering and protecting the image, and this is for enhancing the durability such as the rubbing resistance, the lightfastness and the weather resistance of the image. In case where the transferred image is kept exposed on the surface of the image-receiving sheet and in case where the image durability such as the lightfastness, the rubbing resistance and the chemical resistance of the image is insufficient, the protective layer is effective.

The transferable protective layer laminate comprises a release layer, a protective layer and an adhesive layer formed on a substrate film in that order from the side of the substrate film. The protective layer may be composed of plural layers. In case where the protective layer has the other functions of the other layers, then the release layer and the adhesive layer may be omitted. An easy-adhesion layer may be provided on the substrate film.

(Transferable Protective Layer)

The resin to form the transferable protective layer is preferably a resin excellent in rubbing resistance, chemical resistance, transparency and hardness, including, for example, polyester resins, acrylic resins, polystyrene resins, polyurethane resins, acrylic urethane resins, silicone-modified resins of these resins, UV-blocking resins, mixtures of these resins, ionizing radiation-curable resins, UV-curable resins, etc. Above all, preferred are polyester resins, and acrylic resins.

The resins may be crosslinked with various crosslinking agents.

(Resin for Transferable Protective Layer)

The acrylic resin is a conventional known polymer comprising at least one monomer selected from acrylate monomers and methacrylate monomers, which may be copolymerized with styrene, acrylonitrile or the like except the acrylic monomer. Methyl methacrylate is a preferred monomer, and its content in the polymer may be at least 50% by mass.

Preferably, the acrylic resin has a molecular weight of from 20,000 to 100,000.

The polyester resin may be a conventional known saturated polyester resin. Preferably, the polyester resin has a glass transition temperature of from 50 to 120° C., and a molecular weight of from 2,000 to 40,000. More preferably, the molecular weight of the polyester resin is from 4,000 to 20,000, since the transferability of the transfer foil is bettered in transferring the protective layer.

(UV Absorbent)

In the invention, preferably, the protective layer or the adhesive layer contains a UV absorbent. As the UV absorbent, any conventional known inorganic UV absorbent or organic UV absorbent can be used. The organic UV absorbent includes non-reactive UV absorbents such as salicylates, benzophenones, benzotriazoles, triazines, substituted acrylonitriles, hindered amines, etc.; and those prepared by introducing an addition-polymerizing double bond such as a vinyl group, an acryloyl group, a methacryloyl group or the like, or an alcoholic hydroxyl group, an amino group, a carboxyl group, an epoxy group, an isocyanate group or the like into those non-reactive UV absorbents followed by copolymerizing or grafting thermoplastic resins such as acrylic resins or the like with them. A method is disclosed, comprising dissolving an UV absorbent in a monomer or oligomer of resin followed by polymerizing the monomer or the oligomer (JP-A 2006-21333); and the thus-obtained UV-blocking resin may also be used here. In this case, the UV absorbent may be a non-reactive one.

Of those UV absorbents, especially preferred are benzophenones, benzotriazoles and triazines. Preferably, these UV absorbents are combined in accordance with the characteristics of the dye for use in image formation, in such a manner that the resulting combination can cover the effective UV absorption wavelength range. For non-reactive UV absorbents, preferably, a plurality of non-reactive UV absorbents each having a different structure are combined so that any UV absorbent does not precipitate out from the mixture.

Commercial products of UV absorbents are available, including, for example, Tinuvin P (by Ciba-Geigy), JF-77 (by Johoku Chemical), Seesorb 701 (by Shiraishi Calcium), Sumisorb 200 (by Sumitomo Chemical), Biosorb 520 (by Kyodo Chemical Industry), Adekastab LA-32 (by Asahi Denka) (all trade names), etc.

(Formation of Transferable Protective Layer)

The method for forming the protective layer depends on the type of the resin to be used. In general, the protective layer may be formed in the same manner as that for the dye layer mentioned above, and its thickness is preferably from 0.5 to 10 μm.

(Release Layer)

In case where the transferable protective layer is hardly peeled away from the substrate film in thermal transfer, a release layer may be formed between the substrate film and the protective layer. A peeling layer may be formed between the transferable protective layer and the release layer. The release layer may be formed, for example, by coating with a coating liquid that contains at least one of wax, silicone wax, silicone resin, fluororesin, acrylic resin, polyvinyl alcohol resin, cellulose derivative resin, urethane resin, vinyl acetate resin, acryl vinyl ether resin, maleic anhydride resin and copolymer of those resins, according to a conventional known method of gravure coating, gravure reverse coating or the like, followed by drying it. Of the above-mentioned resins, preferred are acrylic resins formed by homopolymerization of acrylic acid, methacrylic acid or the like monomer alone or by copolymerization thereof with any other monomer, or cellulose derivative resins, as they are excellent in the adhesiveness to the substrate film and in the peelability from the protective layer.

The layer may be crosslinked with various crosslinking agents; and ionizing radiation-curable resins and UV-curable resins may also be used for the layer.

The release layer may be one that is transferred onto a transfer object through thermal transfer, or one that remains on the side of the substrate film, or one that undergoes cohesive failure, and any of these may be suitably used herein. As one preferred embodiment, the release layer is non-transferable, and remains on the side of the substrate film through thermal transfer so that the interface between the release layer and the transferable protective layer could still serve as the surface of the protective layer after thermal transfer, from the viewpoint of the surface glossiness and the transfer stability of the protective layer. The release layer may be formed according to a conventional known coating method, and its thickness is preferably from 0.5 to 5 μm or so in dry.

(Adhesive Layer)

An adhesive layer may be provided as the outermost layer of the transferable protective layer laminate, or that is, as the outermost surface of the protective layer. Accordingly, the adhesiveness of the protective layer to the transfer subject may be bettered.

<Heat-Resistant Lubricant Layer>

Preferably, the thermal transfer sheet of the invention has a heat-resistant lubricant layer (this may be referred to as a back layer) on the side (back side) of the substrate film thereof opposite to the side coated with the dye layer, or that is, on the back side to be kept in contact with a heating element such as thermal head or the like.

The heat-resistant lubricant layer is formed so that the thermal transfer sheet could be resistant to thermal energy given thereto from a thermal head, and this prevents thermal fusion with a heating element such as thermal head or the like and enables smooth running. With the recent tendency in the art toward high-speed printing, the thermal energy from thermal head is increasing, and the necessity for the provision of the heat-resistant lubricant layer is increasing.

The heat-resistant lubricant layer may be formed by coating with a coating material prepared by adding a lubricant, a release agent, a surfactant, inorganic particles, organic particles, a pigment or the like to a binder. An interlayer may be formed between the heat-resistant lubricant layer and the support. As the interlayer, disclosed is a layer comprising inorganic fine particles and a water-soluble resin or an emulsifiable hydrophilic resin.

As the binder resin for use in the heat-resistant lubricant layer, usable are known resins that are highly resistant to heat. Examples of the resin include single substances or mixtures of natural or synthetic resins, for example, cellulose resins such as ethyl cellulose, hydroxy cellulose, hydroxypropyl cellulose, methyl cellulose, cellulose acetate, cellulose acetate butyrate, cellulose acetate propionate, nitrocellulose, etc.; vinyl resins such as polyvinyl alcohol, polyvinyl acetate, polyvinyl butyral, polyvinyl acetal, polyvinyl acetacetal resin, vinyl chloride/vinyl acetate copolymer, polyvinyl pyrrolidone, etc.; acrylic resins such as polymethyl methacrylate, polyethyl acrylate, polyacrylamide, acrylonitrile/styrene copolymer, etc.; polyamide resins, polyimide resins, polyamideimide resins, polyvinyltoluene resins, coumarone-indene resins, polyester resins, polyurethane resins, polyether resins, polybutadiene resins, polycarbonate resins, polyolefin chloride resins, fluororesins, epoxy resins, phenolic resins, silicone resins, silicone-modified or fluorine-modified urethanes, etc.

For enhancing the heat resistance of the heat-resistant lubricant layer, known is a technique of crosslinking the resin through irradiation with UV rays or electron beams. The resin may also be crosslinked with a crosslinking agent under heat. In this case, a catalyst may be added to the layer. As the crosslinking agent, known are polyisocyanates, etc. For this, suitable is a resin having a hydroxyl group-type functional group. JP-A 62-259889 discloses formation of a heat-resistant lubricant layer by adding a filler such as an alkali metal or alkaline earth metal salt of a phosphate and calcium carbonate or the like to a reaction product of a polyvinyl butyral and an isocyanate compound. JP-A 6-99671 discloses formation of a polymer compound of forming a heat-resistant lubricant layer by reacting an amino group-having silicone compound and an isocyanate compound having at least two isocyanate groups in one molecule.

In order that the heat-resistant lubricant layer can sufficiently exhibit its function, additives such as a lubricant, a plasticizer, a stabilizer, a filler, a filler for removal of substances adhering to head and the like may be incorporated in the layer.

The lubricant includes solid lubricants of fluorides such as calcium fluoride, barium fluoride, graphite fluoride, etc.; sulfides such as molybdenum disulfide, tungsten disulfide, iron sulfide, etc.; oxides such as lead oxide, alumina, molybdenum oxide, etc.; inorganic compounds such as graphite, mica, boron nitride, clays (talc, acid clay), etc.; organic resins such as fluororesins, silicone resins, etc.; silicone oils; metal soaps such as metal stearates, etc.; waxes such as polyethylene wax, paraffin wax, etc.; surfactants such as anionic surfactants, cationic surfactants, ampholytic surfactants, nonionic surfactants, fluorine-containing surfactants, etc.

Phosphate-based surfactants such as zinc salts of alkylphosphoric monoesters or alkylphosphoric diesters may also be usable, but as having an acid radical, these are problematic in that the phosphate moiety may decompose when the quantity of heat given thereto from thermal head increases, and further the pH of the heat-resistant lubricant layer lowers to thereby increase the corrosion abrasion of thermal head. As opposed to this, known are a method of using a neutralized phosphate-based surfactant, and a method of using a neutralizing agent such as magnesium hydroxide, etc.

As other additives, also mentioned are higher fatty acid alcohols, organopolysiloxanes, organic carboxylic acids and their derivatives, and fine particles of inorganic compounds such as talc, silica, etc.

The heat-resistant lubricant layer may be formed by coating with a coating liquid prepared by dissolving or dispersing a material of additives added to a binder in a solvent, according to a conventional known method of gravure coating, roll coating, blade coating, wire bar coating or the like. The thickness of the layer is preferably from 0.1 to 10 μm, more preferably from 0.1 to 5 μm.

[Thermal Transfer Image-Receiving Sheet]

Next described in detail is a thermal transfer image-receiving sheet to be used as combined with the thermal transfer sheet of the invention for producing thermal transfer prints.

The thermal transfer image-receiving sheet generally has at least one receiving layer containing a thermoplastic dye-receiving polymer and at least one heat-insulating layer on a support. The receiving layer may contain a UV absorbent, a release agent, a lubricant, an antioxidant, a preservative, a surfactant, and other additives. Interlayers such as a gloss-regulating layer, a white background-regulating layer, an antistatic layer, an adhesive layer, a primer layer and the like may be formed between the support and the receiving layer. Preferably, at least one heat-insulating layer is provided between the support and the receiving layer.

Preferably, the receiving layer and the interlayer are formed by a simultaneous multilayer coating method, and if desired, plural interlayers may be provided.

A curling preventing layer, a writing layer and an antistatic layer may be formed on the back of the support. For forming such coating layers on the back of the support, employable is any ordinary method of roll coating, a bar coating, a gravure coating, a gravure reverse coating or the like.

In the invention, the thermal transfer sheet may be combined with any type thermal transfer image-receiving sheet, but is preferably combined with a thermal transfer image-receiving sheet having, on a support, a heat-insulating layer containing a hollow polymer (particle) latex and a receiving layer containing a polymer (particle) latex, for more effectively exhibiting the effect of the invention.

Preferably, a dye-fixable polymer latex is used in the receiving layer in the thermal transfer image-receiving sheet. One or more polymer latexes may be used either singly or as combined.

The polymer latex is generally a dispersion of fine particles of a thermoplastic resin dispersed in a water-soluble dispersant. Examples of the thermoplastic resin for use for the polymer latex in the invention include polycarbonate, polyester, polyacrylate, vinyl chloride copolymer, polyurethane, styrene-acrylonitrile copolymer, polycaprolactone, etc.

Of those, preferred are polycarbonate, polyester and vinyl chloride copolymer; and more preferred are polyester and vinyl chloride copolymer.

The polyester is obtained through condensation of a dicarboxylic acid derivative and a diol compound, and may have an aromatic ring or a saturated hydrocarbon ring, and may have a water-soluble group for imparting dispersibility to the polyester.

The vinyl chloride copolymer includes vinyl chloride-vinyl acetate copolymer, vinyl chloride-acrylate copolymer, vinyl chloride-methacrylate copolymer, vinyl chloride-vinyl acetate-acrylate copolymer, vinyl chloride-acrylate-ethylene copolymer, etc. The copolymer may be a binary copolymer or a ternary or more polynary copolymer, in which the monomers may be distributed irregularly or may be block-copolymerized.

An auxiliary monomer component such as vinyl alcohol derivative, maleic acid derivative, vinyl ether derivative or the like may be added to the copolymer. Preferably, the vinyl chloride component accounts for at least 50% by mass of the copolymer, and the auxiliary monomer component such as maleic acid derivative, vinyl ether derivative or the like accounts for at most 10% by mass of the copolymer.

One or more polymer latexes may be used either singly or as combined. The polymer latex may have a uniform structure, or may be a core/shell latex. In the latter case, the resins constituting the core and the shell may have a different glass transition temperature.

The glass transition temperature (Tg) of the polymer latex is preferably from 20° C. to 90° C., more preferably from 25° C. to 80° C.

Commercial products of acrylate latex are available, for example, Nippon Zeon's Nipol LX814 (Tg 25° C.), Nipol LX857X2 (Tg 43° C.) (both trade names), etc.

Commercial products of polyester latex are available, for example, Toyobo's Vylonal MD-1100 (Tg 40° C.), Vylonal MD-1400 (Tg 20° C.), Vylonal MD-1480 (Tg 20° C.), MD-1985 (Tg 20° C.) (all trade names), etc.

Commercial products of vinyl chloride copolymer are available, for example, Nisshin Chemical Industry's Vinybran 276 (Tg 33° C.), Vinybran 609 (Tg 48° C.), Sumika Chemtex's Sumielite 1320 (Tg 30° C.), Sumielite 1210 (Tg 20° C.) (all trade names), etc.

Regarding the amount of the polymer latex to be added to the receiving layer, preferably, the solid content of the polymer latex is from 50 to 98% by mass of all the polymers in the layer, more preferably from 70 to 95% by mass. Preferably, the mean particle size of the polymer latex is from 30 to 300 nm.

(Heat-Insulating Layer)

Preferably, the heat-insulating layer contains a hollow polymer from the viewpoint of increasing the transfer density.

The hollow polymer in the invention means polymer particles having a hollow inside the particles. The hollow particles are preferably in the form of aqueous dispersion, including, for example, 1) non-foaming hollow polymer particles of such that a dispersant such as water is inside the partitioning walls formed of polystyrene, acrylic resin, styrene-acrylic resin or the like, and after coating and drying, the dispersant water inside the particles is evaporated away from the particles to give hollow particles; 2) foaming microballoons of such that a low-boiling-point liquid such as butane, pentane or the like is enveloped with a resin comprising any of polyvinylidene chloride, polyacrylonitrile, polyacrylic acid, polyacrylate, or their mixture or polymer, and after coating, the low-boiling-point liquid inside the particles is expanded to give a hollow space inside the foamed particles; 3) microballoons prepared by previously heating and foaming the above 2) to be hollow particles; etc.

Of those, the hollow particles in the invention are preferably the above-mentioned 1) non-foaming hollow particles, and if desired, two or more different types of those hollow particles may be mixed for use herein. Their concrete examples are Rohm & Haas' Rohpake HP-1055, JSR's SX866(B), Nippon Zeon's Nipol MH5055 (all trade names).

Preferably, the mean particle size of the hollow particles is from 0.1 to 5.0 μm, more preferably from 0.2 to 3.0 μm, even more preferably from 0.4 to 1.4 μm.

Also preferably, the hollow particles have a degree of hollowness of from 20 to 70% or so, more preferably from 30 to 60%.

The size of the hollow polymer particles may be computed as follows: Using a transmission electronic microscope, the circle-equivalent outer diameter of each particle is measured, and the data are averaged. Concretely, at least 300 hollow polymer particles are analyzed with a transmission electronic microscope, and the circle-equivalent outer diameter of each particle is measured, and the data are averaged. The degree of hollowness of the hollow polymer may be derived from the proportion of the volume of the void part in a particle to the volume of the particle.

As the polymer property thereof, the hollow polymer preferably has a glass transition temperature (Tg) of from 70° C. to 200° C., more preferably from 90° C. to 180° C. As the hollow polymer, more preferred is hollow polymer latex.

In the thermal transfer image-receiving sheet, the receiving layer and/or the heat-insulating layer may contain a water-soluble polymer. Preferably, the receiving layer contains a polymer latex or a water-soluble polymer from the viewpoint of the print runnability to which the subject matter of the invention is directed. The water-soluble polymer has a solubility of at least 0.05 g in 100 g of water at 20° C., more preferably having a solubility of at least 0.1 g, even more preferably at least 0.5 g.

The water-soluble polymer usable in the thermal transfer image-receiving sheet includes carrageenans, pectin, dextrin, gelatin, casein, carboxymethyl cellulose, hydroxyethyl cellulose, hydroxypropyl cellulose, polyvinyl pyrrolidone, polyvinyl pyrrolidone copolymer, polyvinyl alcohol, polyethylene glycol, polypropylene glycol, water-soluble polyester, etc. Of those, preferred are gelatin and polyvinyl alcohol.

Gelatin having a molecular weight of from 10,000 to 1,000,000 is usable herein. Gelatin may contain an anion such as $Cl^-$, $SO_4^{2-}$, etc., and may contain a cation such as $Fe^{2+}$, $Ca^{2+}$, $Mg^{2+}$, $Sn^{2+}$, $Zn^{2+}$, etc. Preferably, gelatin is dissolved in water and added.

Any known crosslinking agent may be added to gelatin, for example, aldehyde-type crosslinking agent, N-methylol-type crosslinking agent, vinylsulfone-type crosslinking agent, chlorotriazine-type crosslinking agent, etc. Of those, preferred are vinylsulfone-type crosslinking agent and chlorotriazine-type crosslinking agent, and their specific examples include bisvinylsulfonyl methyl ether, N,N'-ethylene-bis(vinylsulfonylacetamide)ethane, 4,6-dichloro-2-hydroxy-1,3,5-triazine or its sodium salt.

Various types of polyvinyl alcohols are usable, including completely saponified polyvinyl alcohols, partially saponified polyvinyl alcohols, modified polyvinyl alcohols, etc. These polyvinyl alcohols are described in Nagano et al's "Poval" (published by Kobunshi Kanko-kai), and are usable in the invention. The viscosity of polyvinyl alcohol can be regulated and stabilized by a minor amount of a solvent or an inorganic salt added to the aqueous solution thereof, and precisely, those described in the above-mentioned reference, pp. 144-154 can be used here. As one typical example, boric acid is preferably added to polyvinyl alcohol so as to improve the quality of the coating film. Preferably, the amount of boric acid to be added is from 0.01 to 40% by mass relative to polyvinyl alcohol.

As specific examples of polyvinyl alcohol, completely saponified products include PVA-105, PVA-110, PVA-117, PVA-117H, etc.; partially saponified products include PVA-203, PVA-205, PVA-210, PVA-220, etc.; modified polyvinyl alcohols include C-118, HL-12E, KL-118, MP-203, etc. (These are all trade names by Kuraray.)

Preferably, a release agent is incorporated in the receiving layer of the thermal transfer image-receiving sheet. Known release agents are usable, including, for example, solid waxes such as polyethylene wax, amide wax, etc.; silicone oils, phosphate compounds, fluorine-containing surfactants, silicone surfactants. Preferred are silicone lubricants; and more preferred is polyether-modified silicone.

[Image Formation Method]

The image formation method of the invention is described.

The image formation method of the invention comprises putting a thermal transfer sheet having, sequentially in that order on a substrate film, a subbing layer containing at least one of colloidal silica and colloidal alumina, and a dye layer containing a polyvinyl acetal resin having an acetacetal group in an amount of from 3.0 to 30.0 molar times the butyral group therein, and a dye of the above-mentioned formula (1), and a thermal transfer image-receiving sheet having, on a support, at least one heat-insulating layer and at least one receiving layer, one upon another in such a manner that the dye layer of the thermal transfer sheet is kept in contact with the receiving layer of the thermal transfer image-receiving sheet, and then applying thereto heat energy in accordance with an image signal by a heating element from the side of the heat-resistant lubricant layer of the thermal transfer sheet, thereby recording an image on the image-receiving sheet.

Regarding the details of the method, for example, referred to are those of the method described in JP-A 2005-88545. In the invention, from the viewpoint of shortening the time to be taken before prints are provided to consumers, the printing time is preferably less than 15 seconds, more preferably from 3 to 12 seconds, even more preferably from 3 to 7 seconds.

For satisfying the above-mentioned printing time, the line speed in printing is preferably at most 1.0 msec/line, more preferably at most 0.75 msec/line, most preferably at most 0.65 msec/line. From the viewpoint of enhancing the transfer efficiency under high-speed processing condition, the ultimate temperature of the thermal printer head in printing is preferably from 180° C. to 450° C., more preferably from 200° C. to 450° C., even more preferably from 350° C. to 450° C.

(Peeling Force)

One significant technical characteristic of the invention is to stabilize the peeling force between the thermal transfer sheet and the thermal transfer image-receiving sheet, thereby enabling stable print outputting.

The peeling force in the invention is determined as follows: A laminate piece having a 5 cm length of the two sheets overlaid in such a manner that the dye layer of the thermal transfer sheet is kept in contact with the receiving layer of the thermal transfer image-receiving sheet is peeled in such a manner that any one sheet of the thermal transfer sheet and the thermal transfer image-receiving sheet is fixed and the other sheet is peeled at 180 degrees in the lengthwise direction. In the image formation method of the invention, the peeling force is preferably at most 0.30 N.

More concretely, in a predetermined thermal transfer printer, the thermal transfer sheet and the thermal transfer image-receiving sheet are put one upon another in such a manner that the dye layer of the thermal transfer sheet is kept in contact with the receiving layer of the thermal transfer image-receiving sheet, and heated with a heating element (thermal head) to transfer the dye, and before the start of peeling of the two sheets in the printer, the printer is stopped, and while the thermal transfer sheet and the thermal transfer image-receiving sheet are kept in contact with each other, the sample is taken out and cut into a strip having a width of 5 cm. The strip is set in a peeling force measuring device, in which one end of the thermal transfer sheet and one end of the thermal transfer image-receiving sheet are fixed with a tool in the cross direction (in the direction perpendicular to the peeling direction), and the thermal transfer image-receiving sheet is peeled at a constant peed in the lengthwise direction of the strip at an angle of 180° relative to the surface of the thermal transfer sheet, and the force measured in that condition is the peeling force.

EXAMPLES

The invention is described more concretely with reference to the following Examples. In the following Examples, the material used, its amount and the ratio, the details of the treatment and the treatment process may be suitably modified or changed not overstepping the spirit and the scope of the invention. Accordingly, the invention should not be limitatively interpreted by the Examples mentioned below. In the following Examples, part and % are by mass, unless otherwise specifically indicated.

Example 1

Production of Polyvinyl Acetal Resin

A starting material Poval (20 g), methylene chloride (400 g), hydrochloric acid. (2.0 g) and acetaldehyde and butylaldehyde each in an amount shown in Table 2 below were put into a reactor equipped with a stirrer and a reflux condenser, and heated at 40° C. for 40 hours to complete the reaction. Next, the reaction liquid was reprecipitated in methanol to separate the reaction product.

The obtained resins are shown in Table 2 below.

TABLE 2

| Binder Code | Starting Material Poval | Amount Fed into Reactor: acetaldehyde (g) | Amount Fed into Reactor: butylaldehyde (g) | $^1$H-NMR Integral Data (relative value) of Final Binder: Ac | Bt | Ac/Bt | molecular weight (×10000) |
|---|---|---|---|---|---|---|---|
| B1 | PVA110 | 21.9 | 4.5 | 28.0 | 1 | 28.0 | 9.0 |
| B2 | PVA110 | 18.3 | 104 | 10.0 | 1 | 10.0 | 9.1 |
| B3 | PVA110 | 14.5 | 16.6 | 5.0 | 1 | 5.0 | 9.0 |
| B4 | PVA124 | 14.5 | 16.6 | 5.0 | 1 | 5.0 | 34.2 |
| B5 | PVA124 | 9.0 | 25.7 | 2.0 | 1 | 2.0 | 34.7 |
| B6 | PVA110 | 14.5 | 16.6 | 5.0 | 1 | 5.0 | 9.2 |
| B7 | PVA124 | 14.0 | 17.0 | 4.9 | 1 | 4.9 | 34.0 |

In Table 2, Ac and Bt each mean the integral value, as measured in $^1$H-NMR, of the amount of the acetacetal group and that of the butyral group in the polyvinyl acetal resin binder, expressed as a relative value of the acetacetal group and that of the butyral group based on the amount of butyral group, 1. The molecular weight is the mass-average molecular weight of the polyvinyl acetal resin binder.

(Production of Thermal Transfer Sheet)

A back layer coating liquid was applied to a substrate of 6.0-μm thick polyester film, of which one surface had been processed for easy adhesion, (Diafoil K200E-6F, trade name by Mitsubishi Polyester Film), on the other surface thereof opposite to the easy adhesion-processed surface, to be a coating amount as the solid content after dried of 1 g/m$^2$. After coated, this was cured by heat treatment at 60° C.

Back Layer Coating Liquid:

| | |
|---|---|
| Acrylic polyol resin (Acrydic A-801, trade name by DIC) | 26.3 mas. pts. |
| Zinc stearate (SZ-2000, trade name by Sakai Chemical Industry) | 0.43 mas. pts. |
| Phosphate (Prisurf A217, trade name by Daiichi Kogyo Seiyaku) | 1.27 mas. pts. |
| Isocyanate (50% solution) (Burnock D-800, trade name by DIC) | 8.0 mas. pts. |
| Methyl ethyl ketone/toluene (2/1 by mass) | 64 mas. pts. |

On the easy-adhesion layer-coated side of the thus-prepared polyester film, subbing layers mentioned below and dye layers also mentioned below were formed as combined, thereby producing a thermal transfer sheet. In the subbing layers, the solid coating amount was 0.03 g/m$^2$; and in the dye layers, the solid coating amount was 0.8 g/m$^2$.

Dye Layer Coating Liquid 1:

| | |
|---|---|
| Dye of Compound 1-1 | 7.8 mas. pts. |
| Phenoxy resin (PKHJ, trade name by Union Carbide) | 10.0 mas. pts. |
| Release agent (X-22-3000T, trade name by Shin-etsu Chemical Industry) | 0.05 mas. pts. |
| Release agent (TSF4701, trade name by Momentive Performance Materials Japan) | 0.03 mas. pts. |
| Mat agent | 0.15 mas. pts. |
| Methyl ethyl ketone | 41 mas. pts. |
| Toluene | 41 mas. pts. |

Dye Layer Coating Liquid 2:

| | |
|---|---|
| Solvent Blue 63 (S.B.63, by Nippon Kayaku) | 7.8 mas. pts. |
| Polyvinyl acetal resin (resin outside the invention) (Eslec BX-1, trade name by Sekisui Chemical Industry) | 0.0 mas. pt. |
| Release agent (X-22-3000T, trade name by Shin-etsu Chemical Industry) | 0.05 mas. pts. |
| Release agent (TSF4701, trade name by Momentive Performance Materials Japan) | 0.03 mas. pts. |
| Mat agent | 0.15 mas. pts. |
| Methyl ethyl ketone | 41 mas. pts. |
| Toluene | 41 mas. pts. |

Dye Layer Coating Liquid 3:

| | |
|---|---|
| Dye of Compound 1-1 | 7.8 mas. pts. |
| Binder B1 (mentioned above) | 10.0 mas. pts. |
| Release agent (X-22-3000T, trade name by Shin-etsu Chemical Industry) | 0.05 mas. pts. |
| Release agent (TSF4701, trade name by Momentive Performance Materials Japan) | 0.03 mas. pts. |
| Mat agent | 0.15 mas. pts. |
| Methyl ethyl ketone | 41 mas. pts. |
| Toluene | 41 mas. pts. |

Dye Layer Coating Liquid 4:

| | |
|---|---|
| Dye of Compound 1-1 | 7.8 mas. pts. |
| Binder B2 (mentioned above) | 10.0 mas. pts. |
| Release agent (X-22-3000T, trade name by Shin-etsu Chemical Industry) | 0.05 mas. pts. |
| Release agent (TSF4701, trade name by Momentive Performance Materials Japan) | 0.03 mas. pts. |
| Mat agent | 0.15 mas. pts. |
| Methyl ethyl ketone | 41 mas. pts. |
| Toluene | 41 mas. pts. |

Dye Layer Coating Liquid 5:

| | |
|---|---|
| Dye of Compound 1-1 | 7.8 mas. pts. |
| Binder B3 (mentioned above) | 10.0 mas. pts. |
| Release agent (X-22-3000T, trade name by Shin-etsu Chemical Industry) | 0.05 mas. pts. |
| Release agent (TSF4701, trade name by Momentive Performance Materials Japan) | 0.03 mas. pts. |
| Mat agent | 0.15 mas. pts. |
| Methyl ethyl ketone | 41 mas. pts. |
| Toluene | 41 mas. pts. |

Dye Layer Coating Liquid 6:

| | |
|---|---|
| Dye of Compound 1-1 | 7.8 mas. pts. |
| Binder B4 (mentioned above) | 10.0 mas. pts. |
| Acrylic polyol resin (Acrit 6AZ-215, trade name by Taisei Kako) | 2.0 mas. pts. |
| Release agent (X-22-3000T, trade name by Shin-etsu Chemical Industry) | 0.05 mas. pts. |
| Release agent (TSF4701, trade name by Momentive Performance Materials Japan) | 0.03 mas. pts. |
| Mat agent | 0.15 mas. pts. |
| Methyl ethyl ketone | 40 mas. pts. |
| Toluene | 40 mas. pts. |

Dye Layer Coating Liquid 7:

| | |
|---|---|
| Solvent Yellow 93 (S.Y.93 by Nippon Kayaku) | 7.8 mas. pts. |
| Binder B4 (mentioned above) | 10.0 mas. pts. |
| Acrylic polyol resin (Acrit 6AZ-215, trade name by Taisei Kako) | 2.0 mas. pts. |
| Release agent (X-22-3000T, trade name by Shin-etsu Chemical Industry) | 0.05 mas. pts. |
| Release agent (TSF4701, trade name by Momentive Performance Materials Japan) | 0.03 mas. pts. |
| Mat agent | 0.15 mas. pts. |
| Methyl ethyl ketone | 40 mas. pts. |
| Toluene | 40 mas. pts. |

Dye Layer Coating Liquid 8:

| | |
|---|---|
| Dye of Compound 1-1 | 7.8 mas. pts. |
| Binder B5 (mentioned above) | 10.0 mas. pts. |
| Acrylic polyol resin (Acrit 6AZ-215, trade name by Taisei Kako) | 2.0 mas. pts. |
| Release agent (X-22-3000T, trade name by Shin-etsu Chemical Industry) | 0.05 mas. pts. |
| Release agent (TSF4701, trade name by Momentive Performance Materials Japan) | 0.03 mas. pts. |
| Mat agent | 0.15 mas. pts. |
| Methyl ethyl ketone | 40 mas. pts. |
| Toluene | 40 mas. pts. |

Dye Layer Coating Liquid 9:

| | |
|---|---|
| Dye of Compound 1-1 | 7.8 mas. pts. |
| Binder B6 (mentioned above) | 10.0 mas. pts. |
| Acrylic polyol resin (Acrit 6AZ-215, trade name by Taisei Kako) | 2.0 mas. pts. |
| Release agent (X-22-3000T, trade name by Shin-etsu Chemical Industry) | 0.05 mas. pts. |
| Release agent (TSF4701, trade name by Momentive Performance Materials Japan) | 0.03 mas. pts. |
| Mat agent | 0.15 mas. pts. |
| Methyl ethyl ketone | 40 mas. pts. |
| Toluene | 40 mas. pts. |

Dye Layer Coating Liquid 10:

| | |
|---|---|
| Dye of Compound 1-1 | 7.8 mas. pts. |
| Binder B7 (mentioned above) | 10.0 mas. pts. |
| Acrylic polyol resin (Acrit 6AZ-215, trade name by Taisei Kako) | 2.0 mas. pts. |
| Release agent (X-22-3000T, trade name by Shin-etsu Chemical Industry) | 0.05 mas. pts. |
| Release agent (TSF4701, trade name by Momentive Performance Materials Japan) | 0.03 mas. pts. |
| Mat agent | 0.15 mas. pts. |
| Methyl ethyl ketone | 40 mas. pts. |
| Toluene | 40 mas. pts. |

Dye Layer Coating Liquid 11:

| | |
|---|---|
| Dye of Compound 1-1 | 7.8 mas. pts. |
| Binder B4 (mentioned above) | 10.0 mas. pts. |
| Release agent (X-22-3000T, trade name by Shin-etsu Chemical Industry) | 0.05 mas. pts. |
| Release agent (TSF4701, trade name by Momentive Performance Materials Japan) | 0.03 mas. pts. |
| Mat agent | 0.15 mas. pts. |
| Methyl ethyl ketone | 41 mas. pts. |
| Toluene | 41 mas. pts. |

Dye Layer Coating Liquid 12:

| | |
|---|---|
| Dye of Compound 1-1 | 7.8 mas. pts. |
| Phenoxy resin (PKHJ, trade name by Union Carbide) | 10.0 mas. pts. |
| Acrylic polyol resin (Acrit 6AZ-215, trade name by Taisei Kako) | 1.5 mas. pts. |
| Release agent (X-22-3000T, trade name by Shin-etsu Chemical Industry) | 0.05 mas. pts. |
| Release agent (TSF4701, trade name by Momentive Performance Materials Japan) | 0.03 mas. pts. |
| Mat agent | 0.15 mas. pts. |
| Methyl ethyl ketone | 40 mas. pts. |
| Toluene | 40 mas. pts. |

Subbing Layer Coating Liquid 1:

| | |
|---|---|
| Colloidal silica (Snowtec XS, trade name by Nissan Chemical Industry) | 50 mas. pts. |
| Water | 25 mas. pts. |
| Isopropyl alcohol | 25 mas. pts. |

Subbing Layer Coating Liquid 2:

| | |
|---|---|
| Alumina sol (Alumina Sol 100, by Nissan Chemical Industry) | 50 mas. pts. |
| Water | 25 mas. pts. |
| Isopropyl alcohol | 25 mas. pts. |

These dye layer coating liquids and subbing layer coating liquids were combined as in Table 3 below, thereby producing thermal transfer sheets 1 to 14.

The samples with "no" in the column of subbing layer coating liquid number mean that the dye layer was directly formed on the easy adhesion-treated surface of the substrate film.

TABLE 3

| | Dye Layer | | | | | | Subbing Layer | |
|---|---|---|---|---|---|---|---|---|
| | | | Polyvinyl Acetal Resin (others given for convenience sake) | | | | | |
| Thermal Transfer Sheet | Dye Layer Coating Liquid Number | Dye Compound | Type of Binder Resin | Ratio of Ac/Bt | Mass-Average Molecular Weight (×10000) | Acrylic Polyol Resin 6AZ-215 | Subbing Layer Coating Liquid Number | Inorganic Fine Particles |
| 1 (comparative) | 1 | 1-1 | (PKHJ) | — | — | — | no | — |
| 2 (comparative) | 2 | S.B.63 | BX-1 | 41 | 32 | — | 1 | silica |
| 3 (the invention) | 3 | 1-1 | B1 | 28 | 9 | — | 2 | alumina |
| 4 (the invention) | 4 | 1-1 | B2 | 10 | 9 | — | 2 | alumina |
| 5 (the invention) | 5 | 1-1 | B3 | 5 | 9 | — | 2 | alumina |
| 6 (the invention) | 3 | 1-1 | B1 | 28 | 9 | — | 1 | silica |
| 7 (the invention) | 6 | 1-1 | B4 | 5 | 34 | yes | 1 | silica |
| 8 (comparative) | 7 | S.Y.93 | B4 | 5 | 34 | yes | 1 | silica |
| 9 (comparative) | 6 | 1-1 | B4 | 5 | 34 | yes | no | — |
| 10 (comparative) | 12 | 1-1 | (PKHJ) | — | — | yes | 1 | silica |
| 11 (comparative) | 8 | 1-1 | B5 | 2 | 34 | yes | 1 | silica |
| 12 (the invention) | 9 | 1-1 | B6 | 5 | 9 | yes | 1 | silica |
| 13 (the invention) | 10 | 1-1 | B7 | 4.9 | 34 | yes | 1 | silica |
| 14 (the invention) | 11 | 1-1 | B4 | 5 | 34 | — | 1 | silica |

[Production of Thermal Transfer Image-Receiving Sheet (I)]

Synthetic paper (Yupo FPG200 having a thickness of 200 μm, trade name by Yupo Corporation) was used as a support. Using a bar coater, a white interlayer and a receiving layer each having the composition mentioned below were formed in that order on one side of the support. The dry coating amount of the white interlayer was 1.0 g/$m^2$ and that of the receiving layer was 4.0 g/$m^2$. The coating layers were dried at 110° C. for 30 seconds.

White Interlayer:

| | |
|---|---|
| Polyester resin (Vylon 200, trade name by Toyobo) | 7.6 mas. pts. |
| Fluorescent brightening agent (Uvitex OB, trade name by Ciba Specialty Chemicals) | 0.8 mas. pts. |
| Titanium oxide | 23 mas. pts. |
| Methyl ethyl ketone/toluene (1/1 by mass) | 69 mas. pts. |

Receiving Layer:

| | |
|---|---|
| Vinyl chloride-vinyl acetate resin (Solbine A, trade name by Nisshin Chemical Industry) | 19.6 mas. pts. |
| Amino-modified silicone (X22-3050C, trade name by Shin-etsu Chemical Industry) | 1 mas. pt. |
| Epoxy-modified Silicone (X22-3000E, trade name by Shin-etsu Chemical Industry) | 1 mas. pt. |
| Methyl ethyl ketone/toluene (1/1 by mass) | 78.4 mas. pts. |

[Production of Thermal Transfer Image-Receiving Sheet (II)]

The surface of a paper support double-laminated with polyethylene was processed for corona discharge treatment, and then a sodium dodecylbenzenesulfonate-containing gelatin undercoat layer was formed on it. On this, a subbing layer, a heat-insulating layer, an interlayer and a receiving layer having the composition mentioned below were formed, as laminated in that order from the side of the support, according to the simultaneous multilayer coating method illustrated in FIG. 9 in U.S. Pat. No. 2,761,791. The solid content of each layer was as follows: The subbing layer was 3 g/$m^2$, the heat-insulating layer was 15 g/$m^2$, the interlayer was 2.5 g/$m^2$, and the receiving layer was 2.5 g/$m^2$.

Receiving Layer Coating Liquid (II):

| | |
|---|---|
| Vinyl chloride latex (Vinybran 900, trade name by Nisshin Chemical Industry, solid content 40%) | 20.0 mas. pts. |
| Vinyl chloride latex (Vinybran 690, trade name by Nisshin Chemical Industry, solid content 55%) | 20.0 mas. pts. |
| Gelatin (aqueous 10% solution) | 2.0 mas. pts. |
| Polyvinyl pyrrolidone (K-90, trade name by ISP) | 0.5 mas. pts. |
| Polyether-modified silicone oil (L-7001, trade name by Toray Dow Corning Silicone, side-chain modified type) | 1.0 mas. pt. |
| Surfactant F-1 mentioned below (aqueous 5% solution) | 1.5 mas. pts. |
| Surfactant F-2 mentioned below (aqueous 5% solution) | 5 mas. pts. |
| Water | 50.0 mas. pts. |

Interlayer Coating Liquid:

| | |
|---|---|
| Vinyl chloride latex (Vinybran 690, trade name by Nisshin Chemical Industry, solid content 55%) | 50.0 mas. pts. |
| Gelatin (aqueous 10% solution) | 30.0 mas. pts. |
| Water | 20.0 mas. pts. |

Heat-Insulating Layer Coating Liquid:

| | |
|---|---|
| Acrylic hollow particles (Rohpake HP-1055, trade name by Rohm & Haas, having a mean particle size of 1.0 μm, a solid content of 26.5%, and a degree of hollowness of 55%) | 20.0 mas. pts. |
| Acrylic styrene hollow particles (Nipol MH5055, trade name by Nippon Zeon, having a mean particle size of 0.5 μm and a solid content of 30%) | 3.0 mas. pts. |
| Gelatin (aqueous 10% solution) | 25.0 mas. pts. |
| Styrene-butadiene latex (Nipol 2507H, trade name by Nippon Zeon, having Tg of 58° C., a mean particle size of 250 nm and a solid content of 52%) | 4.8 mas. pts. |
| Water | 47.2 mas. pts. |

Subbing Layer Coating Liquid for Thermal Transfer Image-Receiving Sheet (II):

| | |
|---|---|
| Polyvinyl alcohol (Poval PVA205, trade name by Kuraray) | 5.0 mas. pts. |
| Styrene-butadiene rubber latex (SN-307, trade name by Nippon A & L, having a solid content of 48%) | 60.0 mas. pts. |
| Water | 35.0 mas. pts. |

(Evaluation Method)

(High-Temperature High-Humidity Aging Condition)

Using a thermo-hygrostat, ESPEC's PR-1KP (trade name), a constant temperature-humidity condition at 30° C. and 85% RH was set; and a sample of thermal transfer sheet and a sample of thermal transfer image-receiving sheet were rolled up, and aged therein for 14 days.

(Thermocycle Aging Condition)

A sample of thermal transfer sheet and a sample of thermal transfer image-receiving sheet of Examples and Comparative Examples were rolled up, and aged under the thermocycle condition mentioned below, using a thermo-hygrostat, ESPEC's PR-1KP (trade name).

(1) At 15° C. and 85% RH, for 6 hours (for nighttime outdoor low-temperature high-humidity simulation).

(2) Temperature-humidity condition changed at a rate of +2.5° C./hr and −10% RH/1 hr, taking 6 hours.

(3) At 30° C. and 25% RH, for 6 hours (for daytime outdoor high-temperature low-humidity simulation).

(4) Temperature-humidity condition changed at a rate of −2.5° C./hr and +10% RH/1 hr, taking 6 hours.

One cycle (one day) is from (1) to (4); and 14 cycles were repeated.

(Method of Evaluation of Print Runnability)

After the high-temperature high-humidity aging and the thermocycle aging mentioned above, the samples were tried for printing thereon. Briefly, each sample was combined with a predetermined thermal transfer image-receiving sheet; and using a printer ASK2000 in which the yellow moiety of the ink ribbon was changed to the thermal transfer sheet in Table 3, an yellow maximum density image was outputted on each sample in a thermo-hygrostat at 25° C. and 50% RH, whereupon the print runnability was evaluated. The samples were ranked according to the following criteria A to E.

TABLE 4

| Evaluation Rank | |
|---|---|
| A | No trouble in printing, and no image failure in prints. |
| B | In printing, there occurred some peeling noise, but no image failure was seen in prints. |
| C | In printing, there occurred peeling noise, and there was seen some banding in the print owing to peeling failure; however, the print is acceptable for practical use. |
| D | There was seen banding in the print owing to peeling failure; and the sample is unacceptable for practical use. |
| E | Unpeelable, and the printer stopped; and the sample is unacceptable for practical use |

(Method for Determination of Peeling Force)

After the high-temperature high-humidity aging and the thermocycle aging mentioned above, the samples were tried for printing thereon. Briefly, each sample was set in a printer ASK2000 in which the yellow moiety of the ink ribbon was changed to the thermal transfer sheet mentioned above, an yellow maximum density image was outputted on each sample, and before the start of the peeling of the yellow part of the sample, the printer was stopped, and the sample was taken out while the thermal transfer sheet and the thermal transfer image-receiving sheet were still kept in contact with each other.

Using a surface analyzer, Shinto Science's TYPE 14DR, the sample, as cut to have a width of 5 cm, was set in the analyzer so that the peeling angle between the thermal transfer image-receiving sheet and the ink ribbon could be 180 degrees, and the peeling force was measured according to the above-mentioned method in which, however, the peeling speed was 6000 mm/min.

The thermal transfer sheet and the thermal transfer image-receiving sheet produced in the manner as above were combined variously as in Table 4, and after exposed to the high-temperature high-humidity aging condition and to the thermocycle aging condition, the samples were analyzed and evaluated for the peeling force and the print runnability. The results are shown in Table 5 below.

Test No. 1 is a sample prepared according to the combination of dye and binder used in Example 1 in JP-A 2003-205686, referred to hereinabove in the section of known techniques; and Test No. 2 is a sample prepared according to the combination of a dye layer and a subbing layer used in Example 1 in JP-A 2006-116892, referred to hereinabove in the section of known techniques.

TABLE 5

| Test Number | Thermal Transfer Sheet Number | Thermal Transfer Image-Receiving Sheet Number | Peeling Force (N) | | Result of Print Runnability Evaluation | |
|---|---|---|---|---|---|---|
| | | | after high-temperature high-humidity aging | after thermo-cycle aging | after high-temperature high-humidity aging | after thermo-cycle aging |
| 1 (comparative) | 1 | (I) | 0.22 | 0.64 | B | E |
| 2 (comparative) | 2 | (I) | 0.16 | 0.56 | A | E |
| 3 (the invention) | 3 | (I) | 0.18 | 0.27 | A | C |
| 4 (the invention) | 4 | (I) | 0.22 | 0.24 | B | B |
| 5 (the invention) | 5 | (I) | 0.24 | 0.25 | B | B |
| 6 (the invention) | 6 | (I) | 0.18 | 0.20 | A | B |
| 7 (the invention) | 7 | (II) | 0.19 | 0.10 | A | A |
| 8 (comparative) | 8 | (II) | 0.16 | 0.41 | A | D |
| 9 (comparative) | 9 | (II) | 0.23 | 0.40 | B | D |
| 10 (comparative) | 10 | (II) | 0.22 | 0.39 | B | D |
| 11 (comparative) | 11 | (II) | 0.17 | 0.40 | A | D |
| 12 (the invention) | 12 | (II) | 0.16 | 0.12 | A | A |
| 13 (the invention) | 13 | (II) | 0.19 | 0.11 | A | A |
| 14 (the invention) | 14 | (II) | 0.24 | 0.13 | B | B |
| 15 (the invention) | 7 | (I) | 0.21 | 0.12 | B | A |

As obvious from the above results, the samples falling within the scope of the invention bettered in the peeling force and the print runnability.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 2009-083128, filed on Mar. 30, 2009, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A method for image formation comprising:

putting a thermal transfer sheet and a thermal transfer image-receiving sheet one upon another in such a manner that a dye layer of the thermal transfer sheet is kept in contact with a receiving layer of the thermal transfer image-receiving sheet, wherein the thermal transfer sheet has a subbing layer and a dye layer in this order on a substrate film, in which the subbing layer contains at least one of colloidal silica and colloidal alumina, and the dye layer contains a polyvinyl acetal resin having an acetacetal group in an amount of from 3.0 to 30.0 molar times the butyral group therein, and a dye of the following formula (1):

(1)

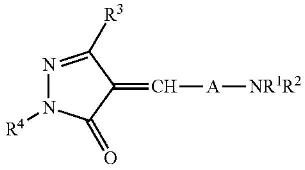

wherein A represents a substituted or unsubstituted phenylene group, $R^1$ and $R^2$ each independently represent a hydrogen atom, a substituted or unsubstituted alkyl group, or a substituted or unsubstituted aryl group, $R^3$ represents a substituted or unsubstituted amino group, a substituted or unsubstituted alkoxy group, or a substituted or unsubstituted aryloxy group, and $R^4$ represents a substituted or unsubstituted alkyl group, or a substituted or unsubstituted aryl group, wherein the thermal transfer image-receiving sheet has, on a support, at least one heat-insulating layer and at least one receiving layer; and applying heat energy in accordance with an image signal by a heating element from the side of the thermal transfer sheet opposite to the side coated with the dye layer, thereby recording an image on the image-receiving sheet.

2. The image formation method according to claim 1, wherein the heat-insulating layer contains hollow polymer particles, and the receiving layer contains a polymer latex or a water-soluble polymer.

3. The image formation method according to claim 1, wherein, when a laminate piece having a 5 cm length of the two sheets overlaid in such a manner that the dye layer of the thermal transfer sheet is kept in contact with the receiving layer of the thermal transfer image-receiving sheet is peeled in such a manner that any one sheet of the thermal transfer sheet and the thermal transfer image-receiving sheet is fixed and the other sheet is peeled at 180 degrees in the lengthwise direction, the peeling force is at most 0.30 N.

* * * * *